Jan. 18, 1938.  A. HENRY  2,106,135

TRACTOR WHEEL

Filed Dec. 11, 1935

INVENTOR.
Alphonse Henry
BY Wood & Wood
ATTORNEYS.

Patented Jan. 18, 1938

2,106,135

UNITED STATES PATENT OFFICE 2,106,135

TRACTOR WHEEL

Alphonse Henry, Hamilton, Ohio, assignor to The Hamilton Caster and Manufacturing Company, Hamilton, Ohio, a corporation of Ohio Application December 11, 1935, Serial No. 53,940

1 Claim. (Cl. 301—52)

This invention relates to improvements in vehicle wheels, and particularly to the driving ground wheels for tractors or like vehicles capable of transporting the vehicle over soft earth as tilled soil in farm cultivation without materially sinking into or compressing the soil, and for a vehicle propulsion at a high rate and reduced power for the normal pulling capacity of the vehicle over prevailing types of tractor wheels now employed, either metal or rubber.

The wheel is primarily referred to herein as a farm tractor drive wheel for the purpose of exemplification, it being obvious that the wheel is adaptable for other types of self-propelled vehicles as may be used for sustaining heavy loads and travel over soft or unpaved surfaces.

An object of the invention is to provide a wheel for tractors or other types of self-propelled vehicles of a structure to facilitate transportation over tilled soil or soft unpaved surfaces without unduly compressing or compacting the soil therebeneath in its propulsion travel thereover, and to eliminate rutting in the tillage of land, or during travel over soft earth without unduly sinking therein which causes an impedance requiring increased propulsion power.

Another object of the invention is to provide a wheel for self-propelled vehicles for travel over soft earth having an increased traction to more smoothly and in a higher travel rate convey or draw increased loads without over-loading the power equipment of the vehicle or necessitating its operation for an extended period with its transmission in low gear above the normal pulling capacity of the vehicle.

Another object of the invention is to provide a tractor or the like vehicle wheel for traveling over tilled soil or soft earth surfaces, having a centrally open hollow tread with spaced gripping cleats interposed and spanning the hollow.

Various other features and advantages of the invention will be more fully set forth in a description of the accompanying drawing, in which.

Figure 1:
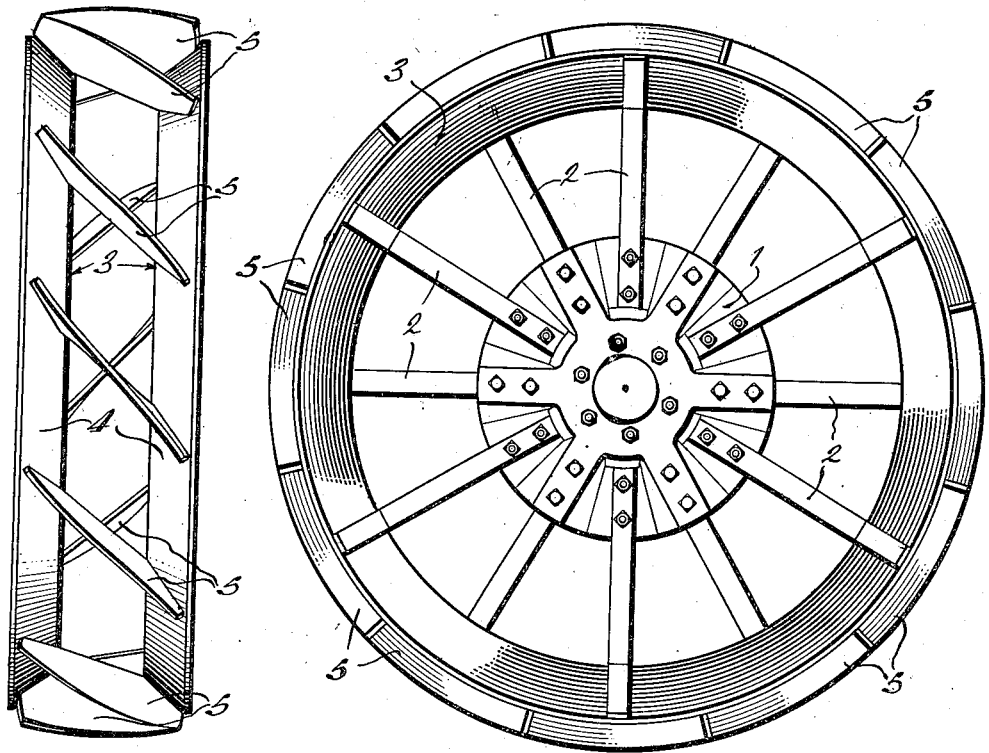
Figure 1 is a side elevation of the improved wheel.
Figure 2:
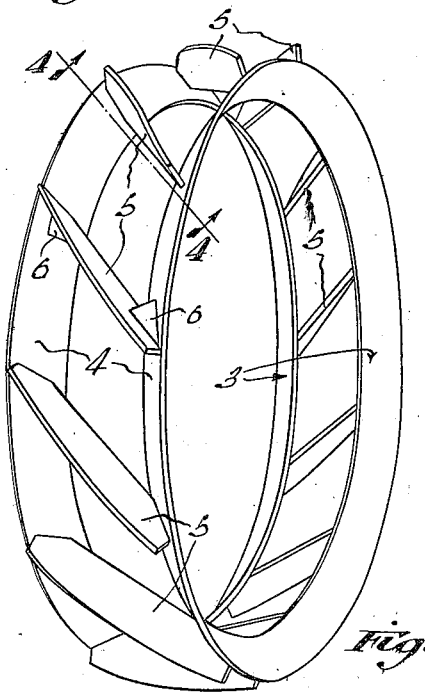
Figure 2 is a face view of the tread of the rim of the wheel.

Referring to the drawing, the hub 1 and spokes 2 of the wheel are of a conventional type now generally employed for tractor drive wheels. The hub is in the form of a plate metal disc having the outer portion of the web embossed or fluted, giving it a zigzag face. One, or inner end of each spoke 2 is bolted or riveted to the inner side of the base of a respective flute, thereby alternately offsetting the same or arranging them in a staggered order. The outer ends of the spokes alternately connect to the lower side of a pair of spaced rim annuli or conical flanges 3—3, each presenting an inclined tread face 4, the inclination of both relatively diverging from their inner edges outwardly and combining to provide a centrally open hollow tread for the rim or tire of the wheel.

The inclination of the annuli faces provides an increased area of tread surface for a minimum rim or tire width of wheel and equally applies a load bearing pressure upon the earth in vertical and laterally angular directions and an impingement on the soil or earth therebetween to sustain the wheel and its carrying load against unduly sinking therein or compacting the earth to the degree of depth as effected by a flat tread rim under the same load.

The rim annuli, being spaced apart, in tilled soil allows a portion of the soil to be squeezed upwardly therebetween and through the central opening, which is easily broken down and respread by the cultivating or seeding tools drawn thereover by the tractor, leaving the soil in a loose condition and practically free from ruts. It has been experienced that the prevailing types of tractor wheel treads, under certain loads, compress the tilled soil to a considerable depth and far below the reach of the cultivating tools, which is injurious to the crops.

The wheel eliminates the characteristics of a compacting roller inherent in the commercial types of tractor wheels having flat tread surfaces, which ruts the ground and, on rolling ground, is apt to cause serious erosion to the field. Also, having the wheel traverse the ground under a minimum degree of depression affords higher rate of travel and power reduction for load propulsion and effecting a saving in engine fuel. It also provides for a more smooth and uniform pull, productive of a more uniform and efficient tillage of the soil.

The centrally open hollow tread provides for a truncated or lateral compression of the soil or earth therebetween as the wheel traverses or travels thereon, thereby centralizing and resisting wheel depression into the soil and avoids soil compaction, to a depth harmful to tillage. The tread, being centrally open, avoids compaction of the earth between the flanges, thereby self-clarifying, which otherwise might tend to destroy the wheel efficiency.

The rim annuli or conical flanges are connected by cross cleats 5 at uniform spacings apart and the cleats are angularly disposed to provide a continuous grip and traction. The cleat longitudinally is formed with a slight twist or curved so that their outer edges lie in a cylinder, increasing its rigidity and giving added traction gripping and greater adaptability toward wheel rolling and in their relative arrangement provide for continuously and progressively biting into the earth, avoiding any jerking or intermittent action to the wheel, thereby also relieving the engine of excessive periodic torque strains. The opposite longitudinal edges of the cleats are angled to butt engage the respective face surfaces of the rim annuli or flanges and are preferably welded thereto, thereby forming an integral or unit rim structure. The longitudinal outer edges of the cleats extend or protrude radially beyond the outer edges or peripheries of the rim annuli to avoid riding on the rim annuli when the wheel traverses hard or paved surfaces, and also accommodate for wear.

Figure 4:
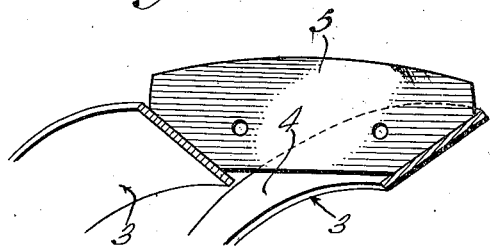
Figure 4 is a section on line 4—4, Figure 3.

As shown in Figure 4, the cleats may be provided with a set of apertures to receive bolts for fastening a renewable wear plate thereto when the outer edges of the cleats are worn to an ineffective degree.

In the modification shown in Figure 6, the cleats 5 extend crosswise in a straight line radially of the wheel and their inner extremities are angularly flanged in opposing directions so that a pair of cleats, with the inclined rim annuli, form hopper-shaped openings through the rim of the wheel. Such disposition and form of cleats are very efficient for light vehicles as garden tractors, which do not drag-hitch cultivating tools, or for traversing over sandy soils in which the hopper-like pocket or opening will increase the traction grip upon the soil compressed therein.

Figures 3, 5:
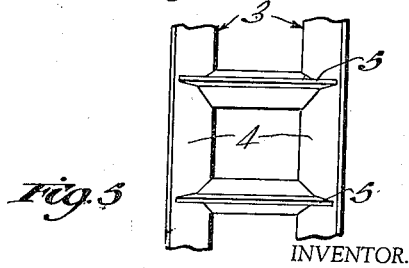
Figure 3 is a perspective view of the rim.
Figure 5 is a face view of a portion or section of a modified form of rim.

The crotch formed by the juncture of a cleat and flange, may be provided with a fillet 6, as shown in Figure 3 to eliminate the collection and deposit of dirt at such points.

Having described my invention, I claim:

A tractor wheel of skeleton structure, comprising, a pair of spaced conical rims in opposing relation with the cones converging toward each other, providing a centrally open recessed tread, and diagonally disposed cleats between the rims with the end of each cleat on one rim being directly axially opposite the end of the succeeding cleat on the other rim for contacting continuity, the cleats projecting radially beyond the periphery of the rims and curved so that their outer edges lie in a cylinder.

ALPHONSE HENRY.